(12) United States Patent
Warnaka et al.

(10) Patent No.: US 6,522,755 B1
(45) Date of Patent: *Feb. 18, 2003

(54) VEHICULAR LOUDSPEAKER SYSTEM

(75) Inventors: Glenn E. Warnaka, State College, PA (US); Mark E. Warnaka, Howard, PA (US); Michael J. Parrella, Weston, CT (US)

(73) Assignee: New Transducers Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/854,589

(22) Filed: May 12, 1997

(51) Int. Cl.[7] ............................. H04B 1/00; H04R 25/00
(52) U.S. Cl. ........................... 381/86; 381/152; 381/190
(58) Field of Search ........................... 381/86, 302, 332, 381/173, 389, 152, 196, 191, 94.1, 94.5

(56) References Cited

FOREIGN PATENT DOCUMENTS

JP          4-97700       * 3/1992

* cited by examiner

Primary Examiner—Xu Mei
(74) Attorney, Agent, or Firm—Foley & Lardner

(57) ABSTRACT

At improved loudspeaker system for a passenger vehicle such as an automobile is disclosed. The system comprises a transducer capable of being excited by applied electric potential and electronic means that is electrically connected to the transducer to apply electric potential thereto. It is a feature of the present invention that the diaphragm driven by the excited transducer is comprised of the trim panel of the vehicle.

36 Claims, 10 Drawing Sheets

VEHICULAR LOUDSPEAKER SYSTEM

This invention relates to a novel speaker system for a vehicle such as an automobile, trucks, boats, aircraft, etc.

Background of the Invention

At present, speakers for a car stereo usually include rearpositioned 2-speaker systems in which two sets of speakers are generally mounted on the rear shelf in back of the rear seat of the vehicle, one on the left side and the other on the right. In addition, almost all cars are also equipped with one set of front speakers, for example, the speaker for the monaural car radio. Thus, in general, at least three sets of speakers are provided. In spite this, such a setup does not result in an ideal speaker system in that it does not meet a desired objective of providing sound which seems, to the listener, to fill the vehicle. Various methods have been utilized to meet this objective, which methods typically involve adding additional speakers to the door panels, etc. Further, the speakers, being located within passenger doors, instrument panels and other accessible areas, are susceptible to malfunction and breakage, such as a result of contact with water and other fluids. With particular regard to speakers located within passenger doors, while believed to be a necessity for satisfactory sound reproduction in a vehicle, they are looked upon with disfavor by the automobile industry, since they require a door having a greater thickness and, therefore, weight than a door in which speakers would not be incorporated. There are also perceived to be design deficiencies inherent when speakers are incorporated in an instrument panel. In both the door and the instrument panel, the speakers are not easily installed and require extensive engineering and much in the way of brackets, fixtures and tooling.

It is an object, therefore, of this invention to provide a speaker system which has excellent acoustical properties for the occupants of the vehicle, and which, because of its construction is more durable and less susceptible to damage and breakage than existing speaker constructions and is easier to install, and which, when present in the door of a vehicle or other interior trim components, does not require additional thickness in the door construction.

These and other features, objects and advantages of the present invention will become apparent upon reading the following description thereof together with reference to the accompanying drawings.

SUMMARY OF THE INVENTION

According to the present invention, selected vehicle passenger compartment trim panels, in addition to having standard decorative features, function as the diaphragm of a vehicle's speaker system. In particular, the loudspeaker system of the present invention comprises a transducer capable of being excited by applied electric potential, a diaphragm that is driven by the excited transducer, with the diaphragm being comprised of a trim panel of the vehicle. In addition, electronic means are electrically connected to the transducer to apply electric potential to it.

DESCRIPTION OF THE DRAWINGS

FIG. 5 also illustrates using more than one piezoelectric element in a single transducer.

DETAILED DESCRIPTION OF THE INVENTION

Figure 1A:
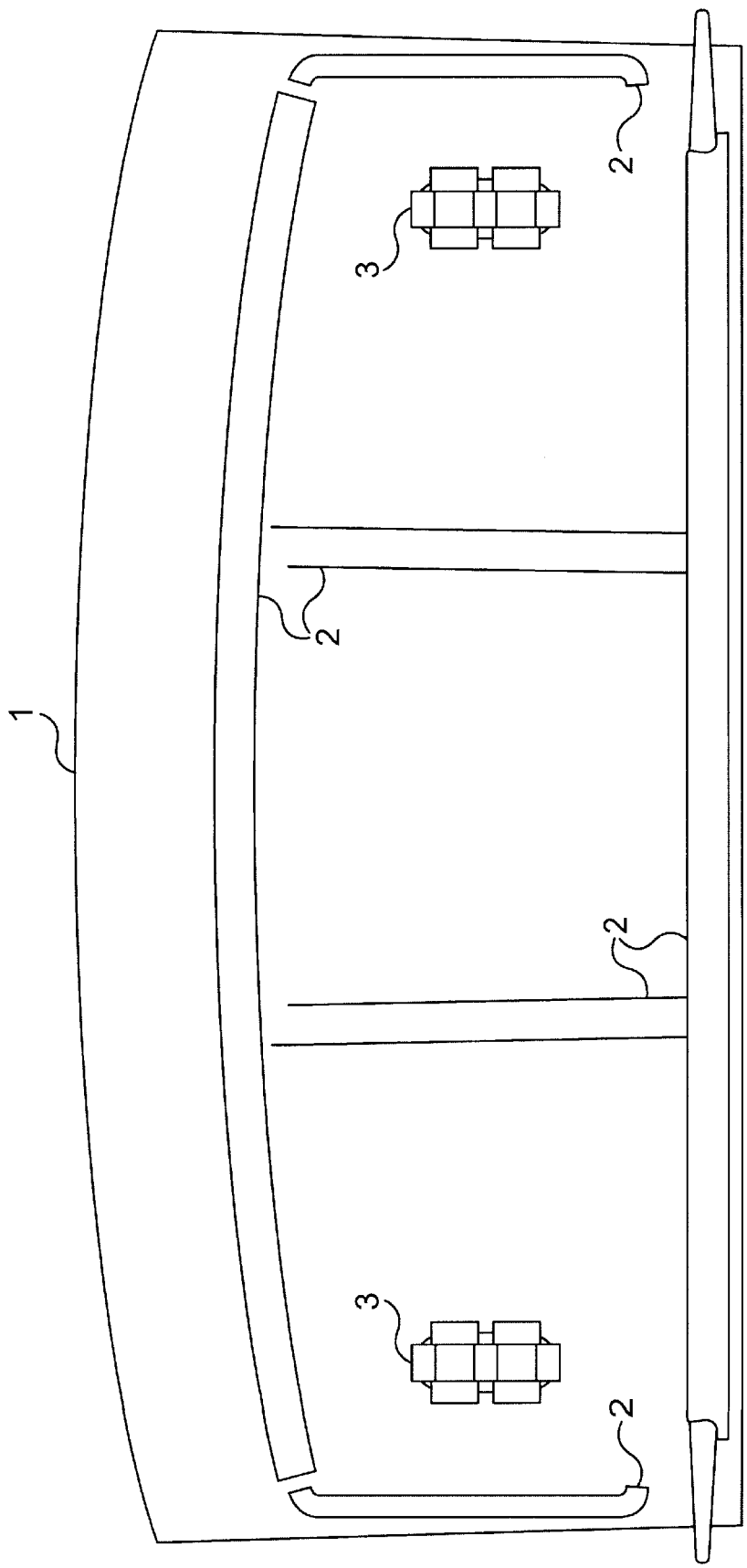
FIG. 1A shows the bottom side of a package shelf for the rear of a vehicle embodying an embodiment of the present invention.

Referring initially to FIG. 1A there is shown an integrally formed trim panel 1 which is adapted to be mounted to the interior, i.e., the passenger compartment, of a vehicle such as an automobile (not shown) so as to present an aesthetically pleasing finished surface to an area of the passenger compartment. A transducer 3, in this instance a flat piezoelectric element, is placed on one side of trim panel 10 and serves to drive the trim panel. The piezoelectric layer may be bonded to the trim panel by any suitable material. The transducer is preferred attached to the side 10$a$ of the trim panel opposite the side (not shown) that will be exposed to the vehicle's passenger compartment, or it may be attached to the side of the trim panel that is exposed to the passenger compartment of the vehicle. One or more transducers may be utilized for each trim panel, if desired. The transducer may be secured to the trim panel by a suitable adhesive. The adhesive selected must be suitable to couple the motion of the transducer to the diaphragm, i.e. the trim panel. Accordingly, the adhesive selected must be more rigid than the diaphragm. While, for example, epoxies, acrylics and hot melt adhesives would be suitable adhesives for use in the present invention rubber cement would typically be not suitable.

One of the reasons a piezoelectric element is the preferred transducer material is that is very thin and light, and thus can be advantageously placed, for example, in the door of a vehicle. Typically the thickness of a piezoelectric element that can be used in the present invention will range from about 0.005 inch to about 0.05 inch. The piezoelectric element will typically have an area ranging from about 0.5 to about 4 square inches, and the weight of the piezoelectric element will range from about 0.25 to about 8 oz., although variations outside these ranges may occur based on the needs of the individual practitioner.

The opposite surface (not shown) of the trim panel may be, for example a decorative surface covered by an upholstery material, such as a fabric, to provide a decorative surface exposed to the passenger compartment of the vehicle. A cloth-like surface may also be obtained by flocking fibrous materials to the surface of the panel. Any decorative layer that covers the trim should not be a barrier to sound.

The trim panel may also include various openings as necessary depending upon body style. However, in some instances, and depending upon the trim panel location within the vehicle, it may be desirable to pre-install certain hardware such as arm rests, lighting modules, control modules for windows and door locks, etc. on the trim panel prior to installing the trim panel in the vehicle.

The trim panel will typically be a generally flat shape made to conform to the interior surface of the vehicle where it will be installed. Typically, vehicle interior door surfaces are relatively flat and other trim panel surfaces are also of limited curvature. However, the trim panel may have decorative ribs, bosses, insets, and similar features to accommodate hardware and to create a pleasing appearance.

The trim panel may serve, for example, as a door panel, instrument panel, seat side panel, seat rear panel, package shelf, headrest, door and window pillar, armrests, console, sun visor and other decorative and/or structural panels located within the interior passenger compartment of the vehicle. Trim panel 10 can be made in a variety of presently employed commercial processes such as by molded material such as a resin impregnated compressed fibrous bat material defining a core or substrate. Typically, the interior door and trim panels of the type described above, are assembled out of separate parts which are positioned upon an inner foundation board and fastened together, one by one, to provide a complete panel assembly. In the case of interior door panels for vehicles, they are typically made by first forming a preselected size and shape foundation board made of a molded plastic part, stiff particle board, fiber board or plastic board like material. Then, one or more cloth like sheets are fastened to the surface of the board. The board may also function to support other items, such as window regular parts, small motors, wiring and the like.

The trim panels suitable for use in the present invention will preferably be of low cost, relatively simple to manufacture and convenient to install. In essence, the trim panels are designed to function as an extended diaphragm for the loudspeaker of the present invention. The trim panel will be specifically selected for radiating sound so that the internal damping of the materials of construction and the configuration of the diaphragm itself provides internal energy absorption that suppresses resonances of the diaphragm and suppresses the formation of unwanted interference fields on the diaphragm.

Typically, the interior door and trim panels of the type described above, are assembled out of separate parts which are positioned upon an inner foundation board and fastened together, one by one, to provide a complete panel assembly. Interior door panels for vehicles are typically made by first forming a preselected size and shape foundation board made of stiff particle board, fiber board or plastic board like material. Then, one or more cloth like sheets are fastened to the surface of the board. The board may also function to support other items, such as window regular parts, small motors, wiring and the like.

The sound radiating trim panel, which in effect is an extended diaphragm, may be made of molded plastic or molded reinforced plastic (such molded trim panels have typically been fabricated of molded fiberglass and molded hardboard and have been of the "one-piece" or integral design); wood or wood fiberboard with a decorative facing; cardboard having a decorative facing and optionally impregnated with a material such as plastic to give it more rigidity; a one-piece construction which is usually fabricated of a hardboard-like material which typically consists of multiple layers of kraft paper and polyethylene on the opposite sides of a Styrofoam core; or sheet metal and sheet metal composites where the sheet metal may be backed by cardboard, wood, fiberboard, and similar composite materials. In addition, the sheet metal may be covered with vinyl, other plastic, cloth, etc. for appearances. The trim panel may optionally be a multi-layer medium which consists of alternating layers of (1) spacing layers of closed cell plastic foam which may be rigid or semi-rigid and (2) relatively inextensible layers of cloth, paper, plastic, metal, foil, composite etc. which are stiff so that they resist stretching. The trim panel can consist of alternate layers of closed cell foam and the above described stiff layers to create a rigid to semi-rigid structure that forms the sound radiating trim panel. One or more of the stiff layers of cloth, paper, plastic, metal, foil, composite etc. may be reinforced with glass and/or carbon fibers and other common reinforcing materials to make the layer even more resistant to stretching. A decorative coating (s) or facing(s) of fabric, flocking, printed fabric, etc. may be affixed to one or both sides of the trim panel. The closed cell foam layer may be replaced by open cell foam, honeycomb, or other spacing materials that have the physical properties to act as a structural spacing layer to the rigid inextensible layers.

Both the spacing and inextensible layers may be made from varying materials within a given diaphragm (i.e. trim panel)and need not all be of the same material.

Typically, the preferred trim panel utilized in the present invention will have a thickness ranging from about a thickness of 0.06 inch to about 0.75 inch, preferably about 0.25 inch to about 0.625 inch, although dimensions outside of such ranges are possible. The specific dimensions for the trim panel will depend of course upon its location within the vehicle, its function, the specific type, make and model of vehicle, and so forth. When formed of multiple spacing and inextensible layers, the trim panel will generally contain from about 1 or 2 to about 5 layers.

As indicated, a variety of decorative covering media can be used so as to provide for universality of application, although where extremely low cost is desired, the trim panel material per se may be textured and/or colored and thus not require a decorative covering medium.

As indicated, the trim panel may be a multi-layer medium, consisting of alternating layers of a spacing material and a rigid inextensible layer. In such instances the spacing material may be a closed cell foam and the rigid inextensible layer may be a cloth layer. The trim panel may be a laminated structure of at least two different materials, one of said materials comprising a substrate and the other of said materials comprising a covering medium. The trim panel may comprise a lamination of at least two layers, with one of said layers comprising a moisture barrier. Alternatively, the trim panel may comprise a lamination of multi-layers, wherein one of said layers comprises an insulating medium.

As indicated, the trim panel may be pre-manufactured to include a variety of accessories. In addition to a trim panel providing aesthetic qualities to the passenger compartment of a vehicle it can be designed to incorporate features such as easily accessible door handles, mirror and window controls, and the like.

Trim panels may be attached to the passenger compartment of the vehicle by a variety of methods, depending upon their location in the vehicle's passenger compartment. For example, the trim panel of a door is usually fastened to the inner door panel. Such fastening is conventionally accomplished through a plurality of trim panel mounted retaining pins which fit through associated openings in the inner door panel. Each retaining pin is secured to a pin receiving bracket, or boss, on the face of the trim panel adjacent the door panel. In addition to providing a means for attachment, the retaining pins also can incorporate moisture control devices and energy absorption characteristics. In another example, trim panels may be attached using adhesives.

FIG. 1A shows the bottom side of a package shelf 1 for the rear of a vehicle, in this case an automobile. The package shelf has various reinforcing ribs 2 to give it greater rigidity. Piezoelectric transducers 3 are shown attached to the bottom side of the package shelf near each side of the automobile. This placement or similar placement would be used to provide or enhance a stereo image for the rear seat passengers. Two transducers, each containing two piezoelectric elements, are depicted. A greater or lesser number of transducers could be placed on the package shelf, depending on the acoustic effect that is desired.

Figure 1B:
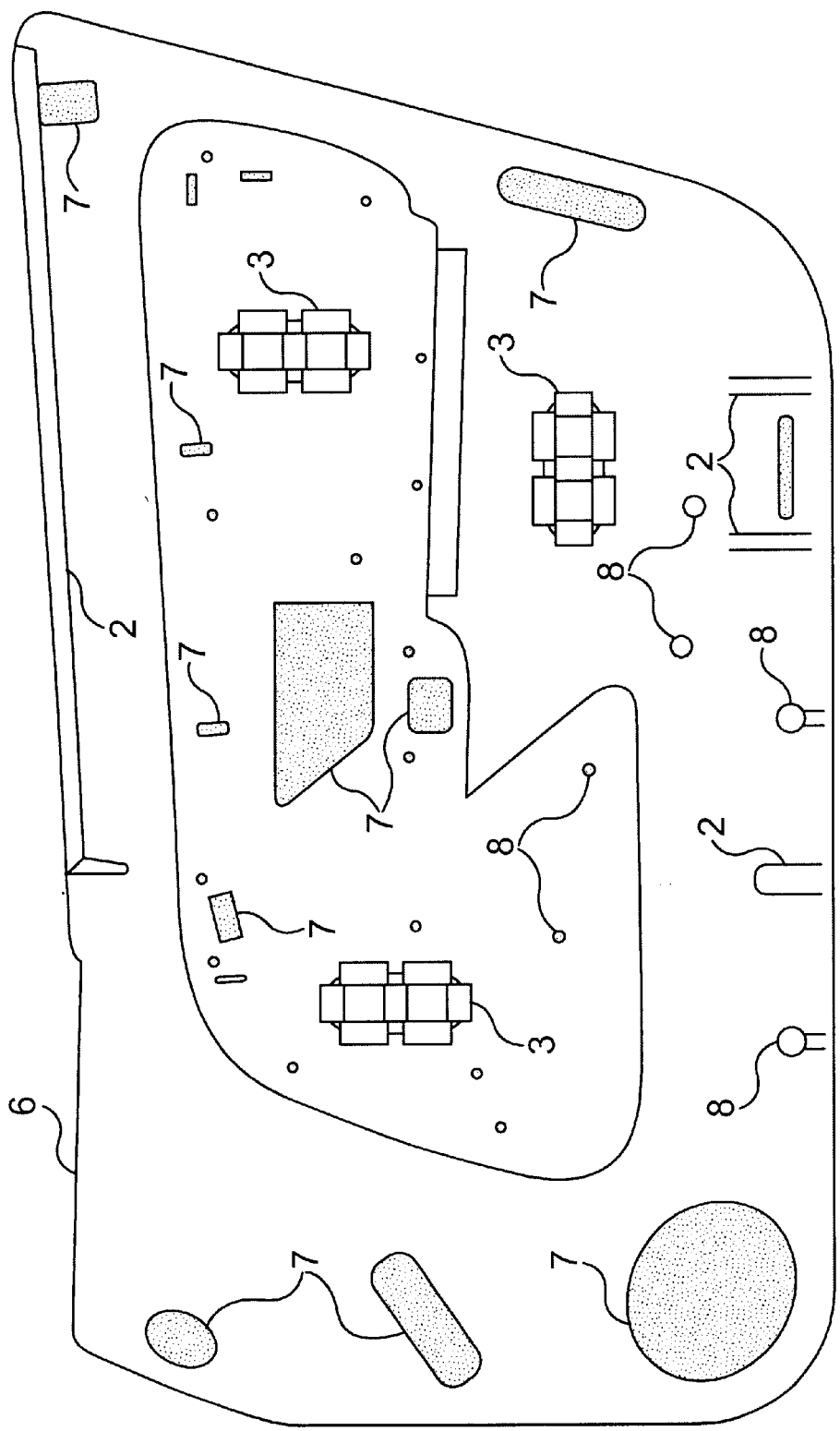
FIG. 1B illustrates the inside of a trim panel for an automobile door embodying an embodiment of the present invention.

FIG. 1B illustrates the rear or inside of a trim panel 6 for an automobile door. The trim panel has reinforcing ribs 2, hole penetrations 7 through the panel to mount various automotive parts such as arm rests, door handles, window and lock controls, etc. In addition, the panel has attachment bosses and screw holes 8 to mount interior components and to mount the panel to the door of the automobile. Also shown are three piezoelectric transducers 3 that are mounted in locations that would enable the transducers 3 to excite panel 6 acoustically. It should be noted that transducers may be mounted in other locations instead of or in addition to door mountings. In one embodiment, however, a right door of an vehicle may have a transducer attached that plays the right channel of a stereo recording, while the left door may have a transducer attached that plays the left channel. In either location or in other locations throughout the vehicle more than a single transducer could be employed, depending upon the acoustic effect that is desired.

Figure 2:
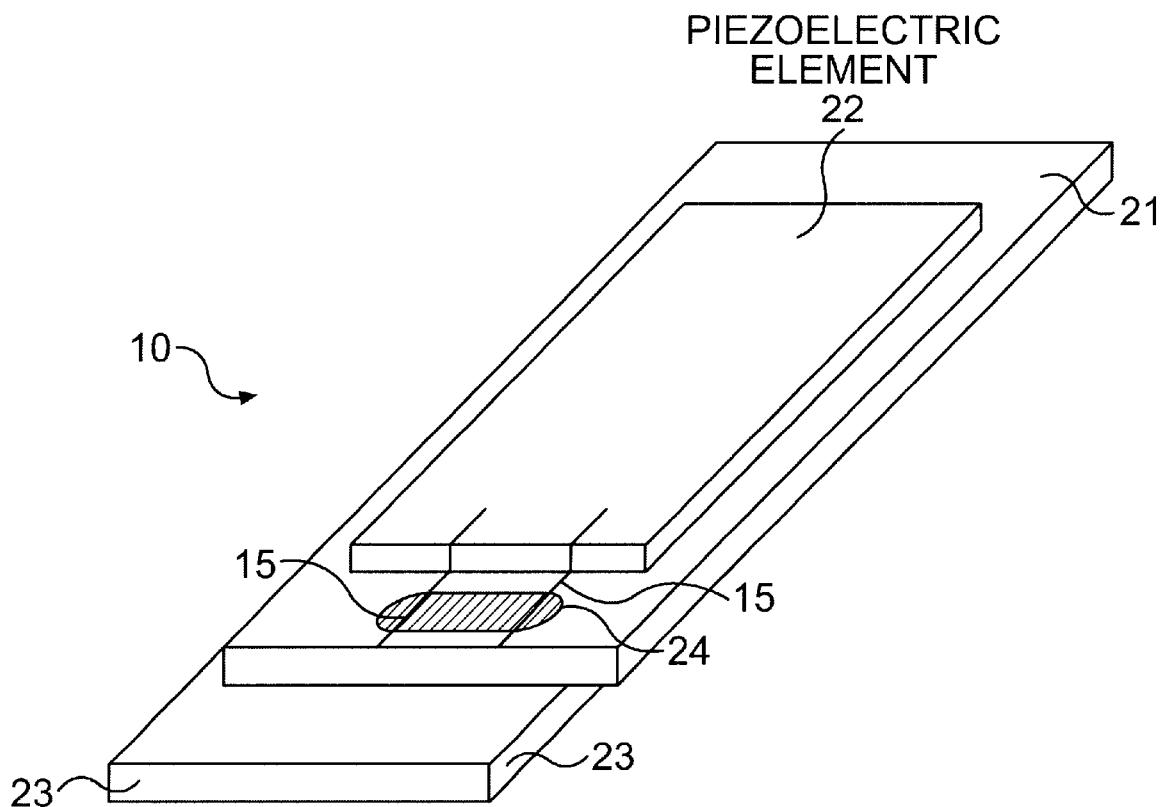
FIG. 2 illustrates one embodiment of a transducer utilized in conjunction with the trim panel according to the present invention.

FIG. 2 shows the use of a substrate 21 which is positioned intermediate the piezoelectric element 22 and the trim panel 23. The substrate 21 will have a larger surface area than the flat piezoelectric element 22 in order to impart motion to a larger area of the trim panel than if the substrate alone was attached to the trim panel. This will result in cost savings since lesser amounts of the costly piezoelectric material need be utilized. The substrate will have a rigidity no greater than the rigidity of the piezoelectric element but greater than the rigidity of a trim panel to which the substrate will be attached.

Many materials may be advantageously be used for the substrate. These materials include steel, aluminum, brass, copper, and other metals, plastics, composite materials, etc. Brass is a preferred material for the substrate because of its low cost, environmental resistance, ease of bondability and because its Young's modulus of elasticity is similar to that of certain piezoelectric materials, such as PZT (lead-zircontitanate).

There is also included means to apply electric potential to the piezoelectric element, which in FIG. 2 comprises a connector 24 for a wire harness which is optionally attached to and extends from substrate 21. FIG. 2 also illustrates electrical leads 15 from the piezoelectric element 22 to connector 24.

Substrate 21 (or piezoelectric element 22 in FIG. 2, when a substrate is not used) will be attached directly to the trim panel. The substrate and/or the transducer element may be preformed, or otherwise configured, to conform to the curvature, or other shape, of the trim panel to which it is attached. In a preferred embodiment, for maximum efficiency and minimum distortion both the mechanical and electrical impedances of the transducer should be matched. That is, the mechanical impedance of the transducer should be matched to that of the trim panel while the electrical impedance of the amplifier that drives the transducer should be matched to that of the transducer when it is radiating sound. In another embodiment, the piezo element may consist of two or more layers arranged on top of one another and electrically connected in an alternating fashion to enhance the motion of the piezoelectric element. The piezoelectric element, when utilized as a transducer, can have a wide variety of shapes, such as square, rectangular and round. Irregular shapes may also be used to minimize resonances on the transducer itself and/or to extend the frequency range. To accomplish the latter goal, elliptical, semi-elliptical, truncated rectangular and truncated square shapes, etc. may be used.

Figure 3:
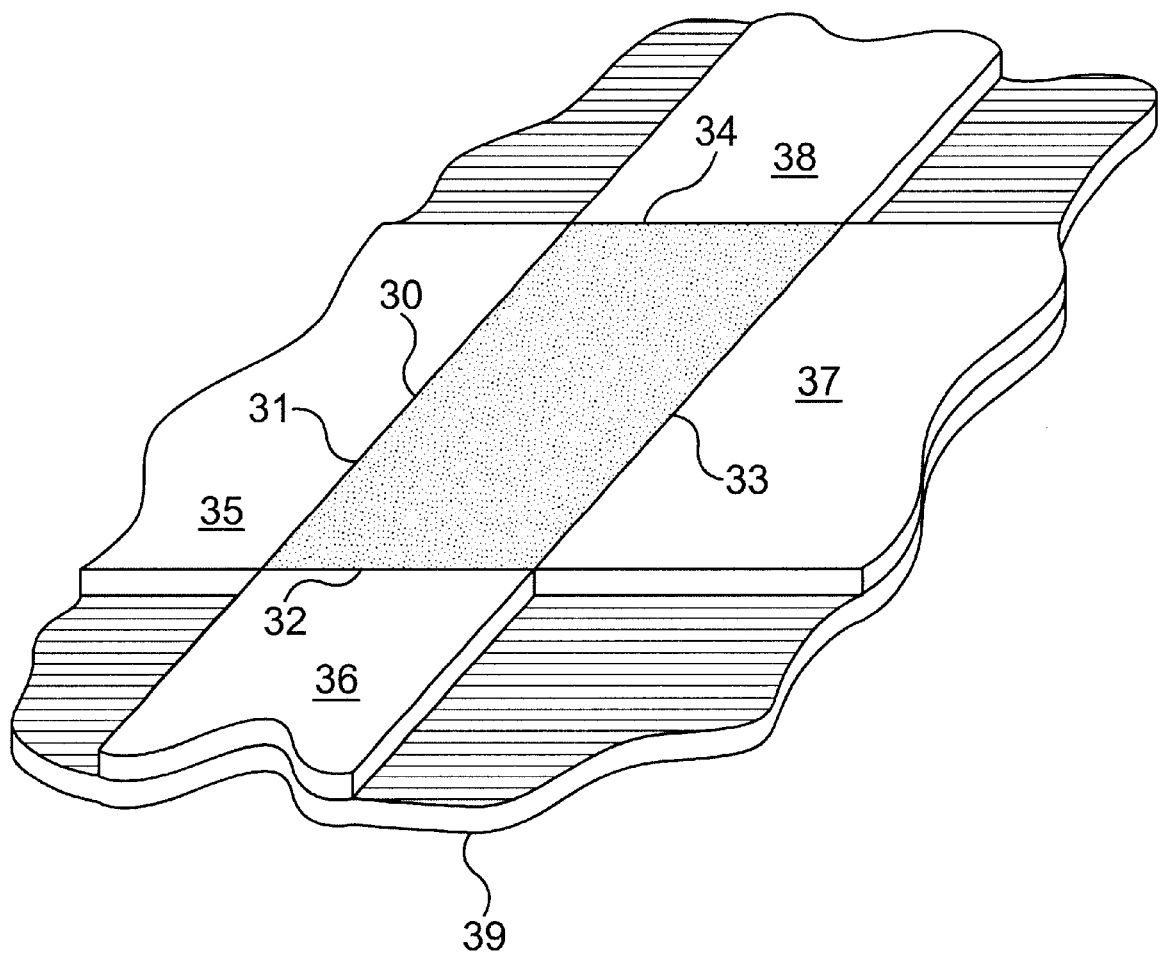
FIG. 3 illustrates another embodiment of a transducer used in the present invention in which a piezoelectric element is utilized in conjunction with motion couplers.

FIG. 3 illustrates another embodiment of a transducer of the present invention in which piezoelectric element 30, which in the illustration has a rectangular shape (although any other shaped piezoelectric element can be utilized in this embodiment) is coupled on, most preferably, all its sides 31,32, 33 and 34 with motion couplers 35, 36, 37, 38 to further ensure the coupling of the motion of the piezoelectric element to substrate 39 by provide a coupling transition to the substrate, to which piezoelectric element 30 is bonded and positioned on top of, in all directions of movement. If desired, the motion couplers may be attached only to certain sides of the piezoelectric element 30. By providing a coupling transition to the substrate it will be further insured that the motion of the piezoelectric element will be coupled to the trim panel (not shown). This is accomplished by tightly coupling, preferably, both the transverse and lateral motions of the piezoelectric element, first to the motion couplers, with the end result that the motion will thereafter be passed through the substrate to the trim panel. The motion couplers will also be attached to the substrate. It has been discovered that the use of the motion couplers will increase the loudness of the sound produced by the trim panel and extend the bass sound produced to lower frequencies.

The thickness of the transducer element comprising the piezoelectric element used in concert with the substrate and motion couplers will typically range from about 0.03 inch to 0.1 inch Substrate 39 (or piezoelectric element 30, when a substrate is not used) will be attached directly to the trim panel.

Figure 4:
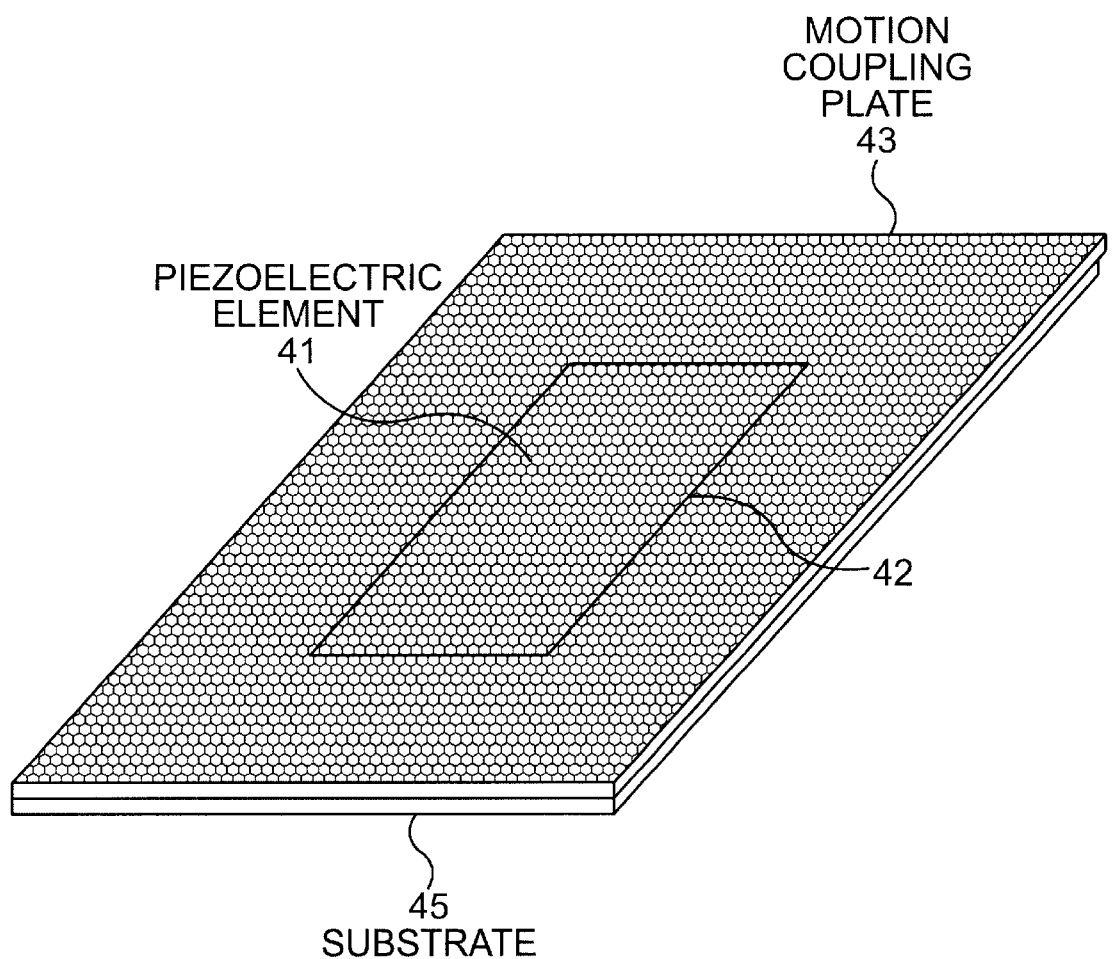
FIG. 4 illustrates a further embodiment of a transducer used in the present invention in which a piezoelectric element is shown as being utilized in conjunction with motion couplers in another manner.

FIG. 4 illustrates a further embodiment of the present invention in which the piezoelectric element 41 is shown as being utilized in conjunction with motion couplers in another manner. In this embodiment, the outer perimeter 42 of transducer 41 is completely surrounded by a single motion coupling plate 43. Motion coupling plate 43 has a hole, which in the depicted embodiment is in its center, which is cut out in order to accommodate the presence of piezoelectric element 41, which must fit the hole in motion coupling plate 43 very snugly so that the piezoelectric element 41 will be bonded at its edges 42 to the edges of the hole in motion coupling plate 43. In general, motion coupling plate 43 should be of the same thickness as transducer 41. Piezoelectric element 41 and motion coupling plate 43 are both bonded to the underlying substrate 45. The material of the motion coupling plate 43 and the substrate 45 may be of the same material or different materials such that the motion of piezoelectric element 41 is not substantially restricted. One advantage of this concept is that less parts are involved and hence the transducer is more readily adaptable to being mass produced.

Figure 5:
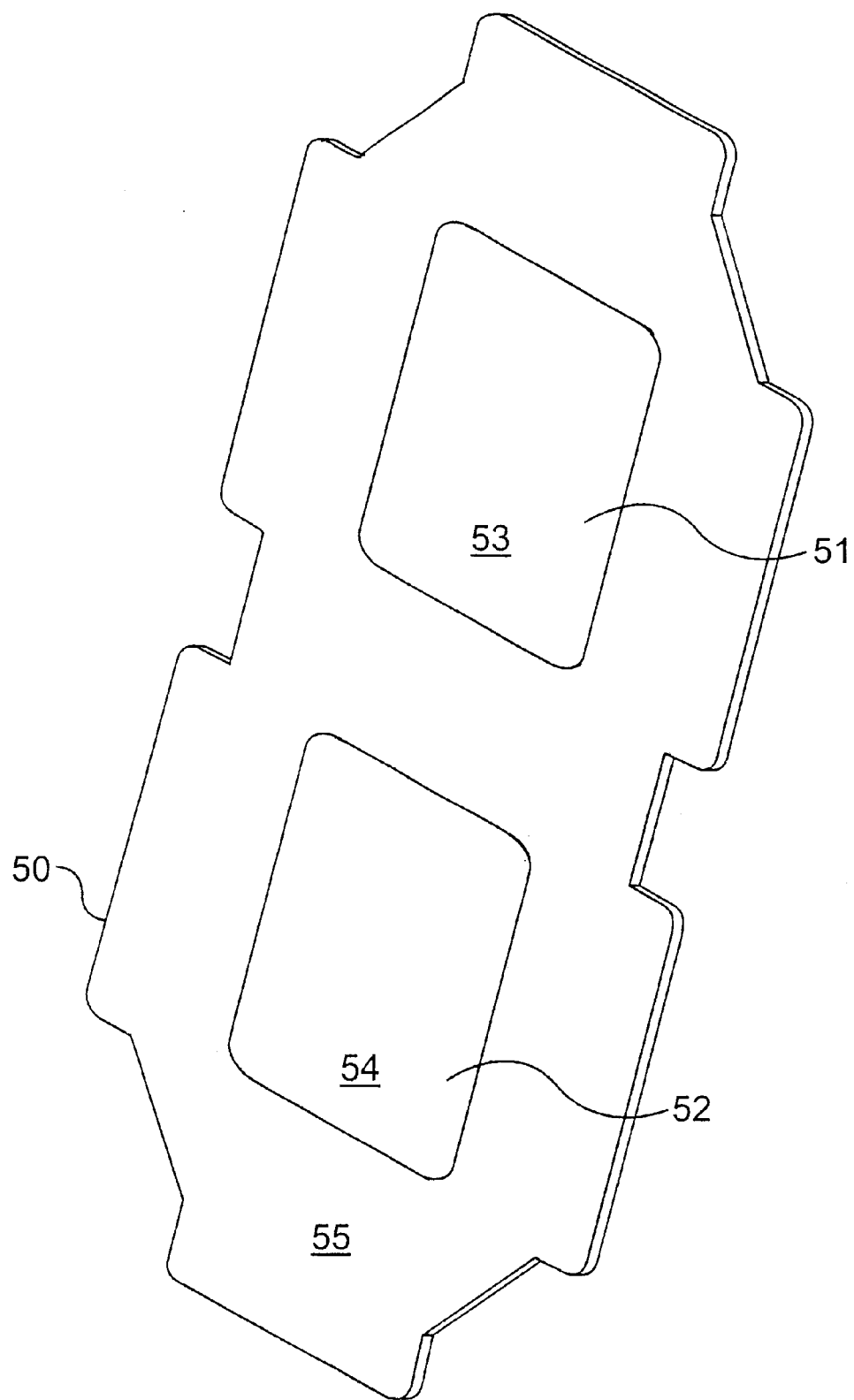
FIG. 5 illustrates another embodiment of a transducer utilized in conjunction with a combined transducer and motion coupler which is applicable for use in the present invention in which the motion coupler and the substrate are an integral unit.

FIG. 5 illustrates a further embodiment of the present invention in which the substrate and motion coupler are formed from the same material and are shaped into an integral unit 50, which is substantially flat. As illustrated, piezoelectric elements 51 and 52, which are also substantially flat, are inset in a depression that is in unit 50, with the top sides 53 and 54 of, respectively, piezoelectric elements 51 and 52 being planar with the top side 55 of unit 50. Alternatively, top sides 53 and 54 can extend above, or be below, side 55. Obviously, unit 50 can be designed to accommodate only one piezoelectric element or two or more piezoelectric elements. In another embodiment, one or more piezoelectric elements can be completely encased within unit 50.

Figure 6:
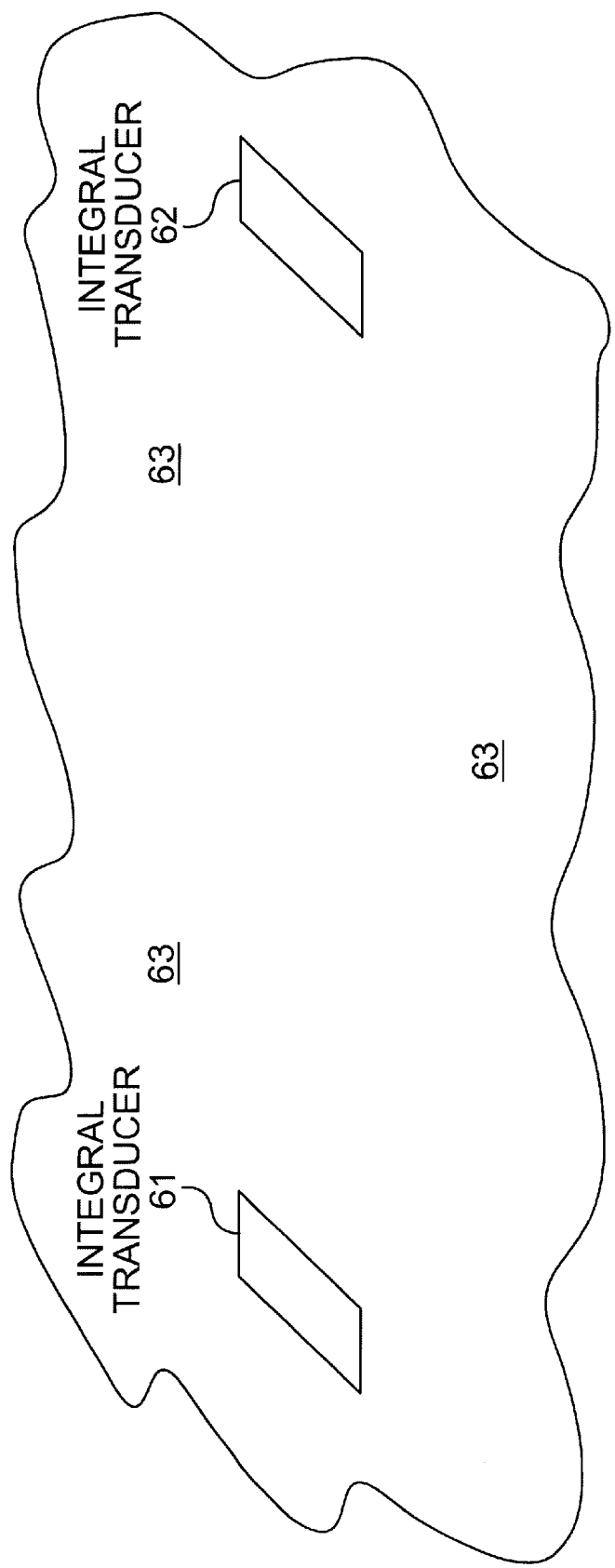
FIGS. 6–7 illustrate another embodiment of the present invention in which two transducers are used on a single trim panel.
Figure 7:
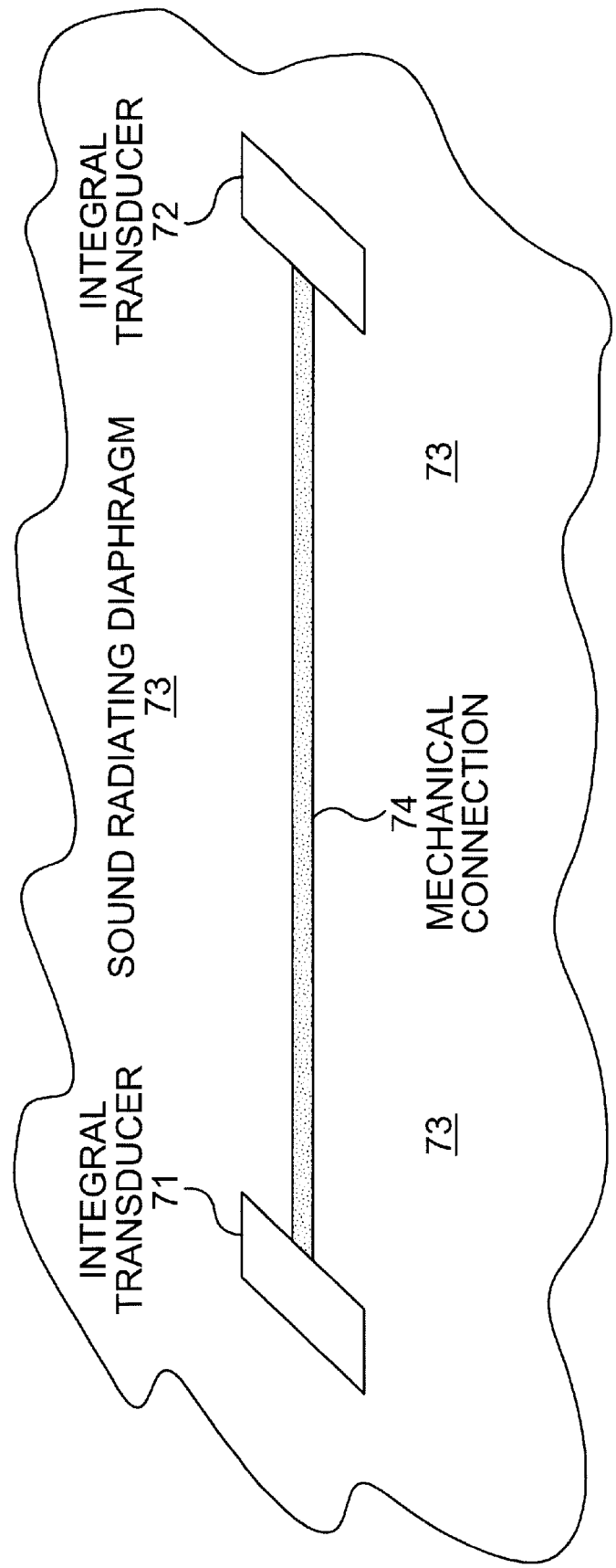

It is a key feature of the present invention that the transducer, when attached to the trim panel, forms a loudspeaker. FIG. 6 illustrates another embodiment of the present invention in which more than one integral transducer, in this case a pair of transducers 61 and 62, which are constructed in accordance with the present invention, are attached to the same trim panel 63. It has been discovered that using more than one transducer in conjunction with the same diaphragm will create a stereo sound image, and will also increase the loudness and/or extend the frequency range. The preferred distance by which the transducers should be separated will depend on the size, material of construction and configuration of the trim panel. For standard sized trim panels, the integral transducers may be separated by a distance of approximately 1.5 feet to about 4 feet. FIG. 7 illustrates a further embodiment of the present invention, and for illustrative purposes has the same configuration as FIG. 6, except that transducers 71 and 72 are connected to each other via a mechanical connector 74. It has been shown that, when such a mechanical connection is employed, the quality of the stereo effect produced will be enhanced and the overall quality and volume of the sound will be improved. In one embodiment, the mechanical connection may take the form of a metal beam of 0.02 inch thick steel, 1 inch wide and a length such that some outward force is exerted on the integral transducers. Of course, other materials of construction and/or other dimensions of mechanical connector 74 may be utilized. In another embodiment, when more than one transducer is utilized in conjunction with a particular diaphragm, the mechanical connector may be an integral part of the transducers. For example, the substrate may be made continuous between the transducers to form the mechanical connection. Alternatively, the motion couplers described above may be formed into an integral mechanical connection.

The transducer utilized in the present invention should have a shape that conforms to the shape of the portion of the trim panel to which it is attached. In those cases where the transducer is a flat piezoelectric element having a top side and an under side, it is preferred that the trim panel has a substantially flat portion to which the under side of the piezoelectric element is joined. In such instances, it is most preferred that the substantially flat portion of the trim panel to which the under side of the piezoelectric element is joined has a greater degree of stiffness than the other portions of the trim panel. In such a case, inter-layers may be added to the diaphragm to increase the degree of stiffness in areas where the transducer is attached. In another embodiment, a transducer may be enclosed within the body of the trim panel. One method of accomplishing this is where the trim panel has a breach which defines an aperture in which said transducer is inserted.

As indicated, the trim panel can be any of a variety of styles and methods of construction. For example, a trim panel may be a composite comprised of a stiffened layer and a compliant layer, with the transducer being located within the compliant layer. In another embodiment the transducer may be located intermediate the compliant layer and the stiffened layer.

Figure 8:
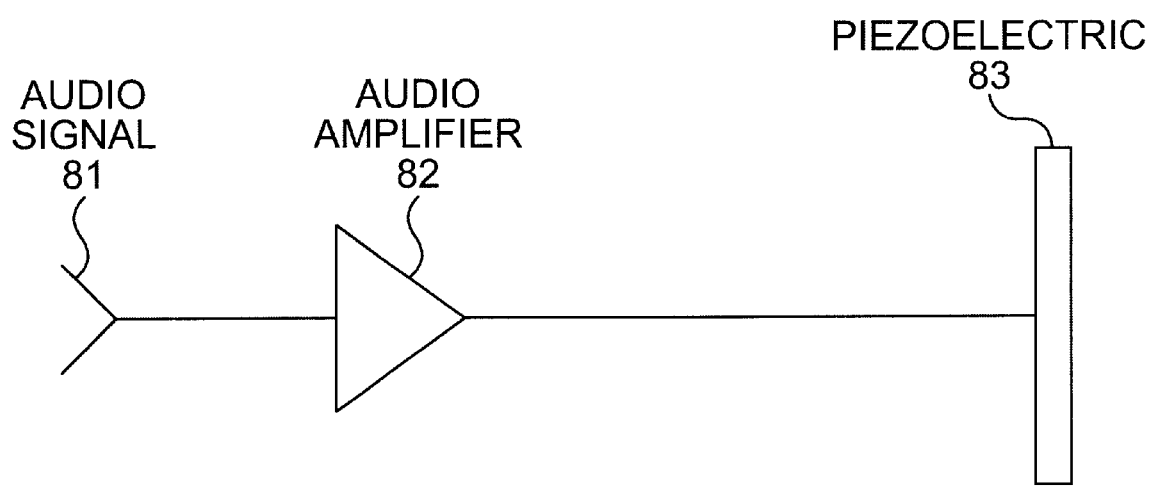
FIG. 8 is a block diagram of an audio circuit utilized in the present application.

All speaker systems require some form of amplifier. The present invention utilizes a system illustrated in the block diagram of FIG. 8. The audio signal 81 is fed into a linear amplifier 82 that provides the signal "boost" or amplification. The output of the amplifier 82 is fed into a piezoelectric element 83.

Figure 9:
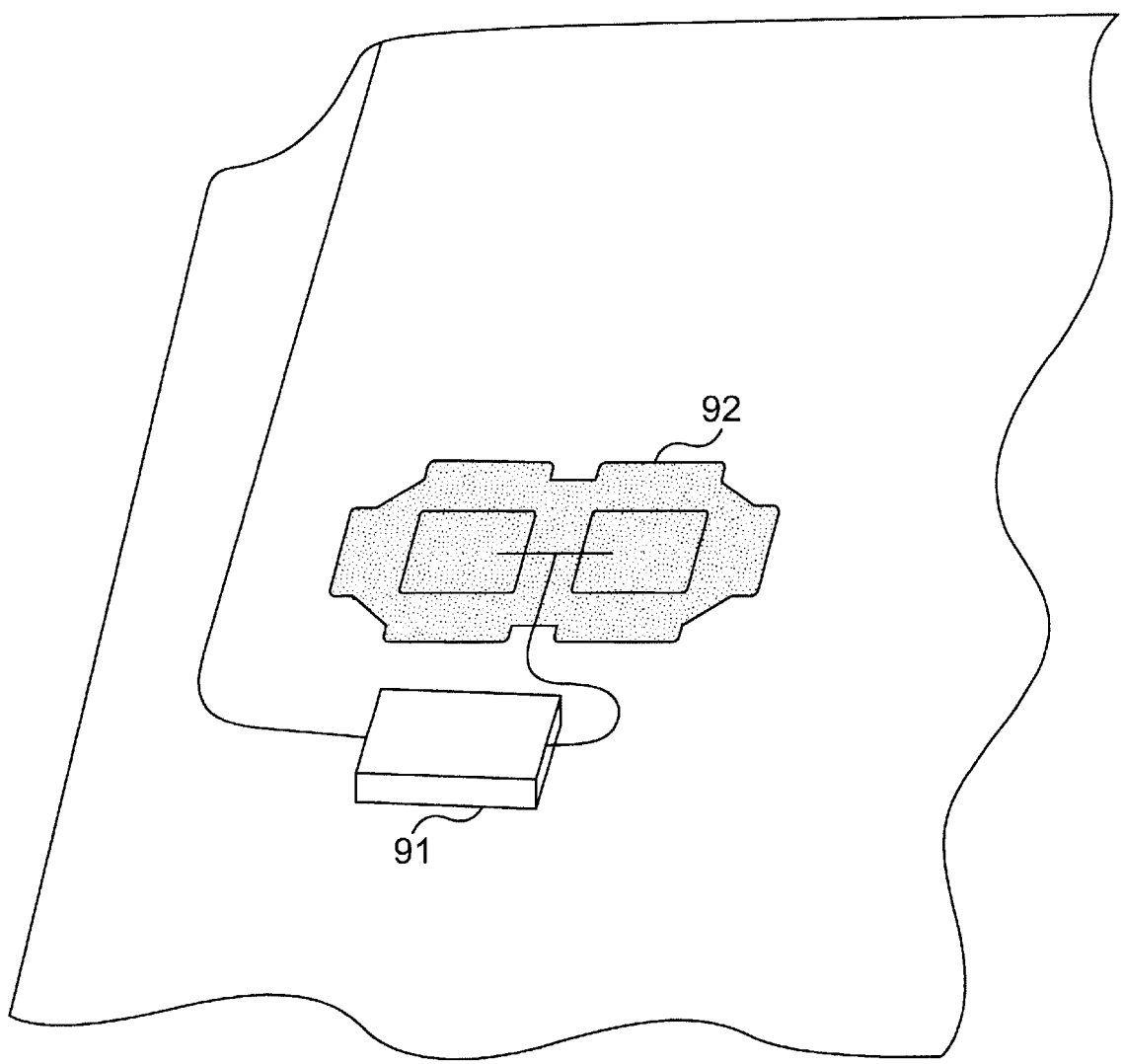
FIG. 9 illustrates a transducer of the present invention utilized in close combination with an amplifier.

It is a particular aspect of piezoelectric transducers that comparatively high voltages may be required to drive the transducer in order to produce a high volume of sound within the vehicle. If the amplifiers are located away from the transducers, such as, with reference to the present invention, in the instrument panel of a car where a radio is installed, this necessitates long wire runs carrying comparatively high voltages, sometimes greater than 50V. FIG. 9 illustrates another aspect of the present invention which addresses this problem. As per FIG. 9, a high voltage, low current amplifier 91 is located adjacent to the transducer 92, thus forming an integrated device this arrangement results in lower voltage requirements for the lines carrying the signal to amplifier 91 from the radio, tape or CD player, etc. Alternatively, the amplifier can be incorporated in the transducer assembly. For example, the audio output of a radio, tapedeck, CD player is about 24V maximum, and the power supply to the amplifier is 12V. Only these lower voltages would be required on wires running to the integrated amplifier/transducer package. The higher voltages necessary to drive the piezoelectric transducer would be confined within the integrated package and would greatly reduce or eliminate the high voltage problem. While it is preferred at all times to cover the transducer with insulating media to prevent moisture or heat buildup and/or dielectric breakdown, there is a particular need for proper insulation when the amplifier is located on or near the transducer. Also, when more than one transducer is utilized in the present invention each will have its corresponding amplifier, which, according to the present embodiment, may be located at or in the vicinity of the corresponding transducer.

In some cases, it might be desirable to energize the piezoelectric transducer from a conventional low voltage, high current amplifier. In such a case, a transformer (not shown) is used to change the low voltage, high current signal to a high voltage, low current signal. When this method of energizing the piezoelectric transducer is used, the transformer can be integrated with the transducer to produce the same results as described above.

It is always preferred to cover the transducer to prevent exposure to moisture when the transducer is incorporated in the door of a vehicle. The thin construction of piezoelectric transducers will enable them to be used in a vehicle's door without appreciably increasing the door's thickness.

Although piezoelectric transducers are preferred, other types of transducers may be used in the invention. For example, the transducer may be a magneto-strictive transducer, an electro-magnetic transducer, an electrostatic transducer or a micro-motor. In such cases, it is preferred that the transducers be substantially flat. Compared to all of the above embodiments, piezoelectric transducers are preferred because they are much thinner and lighter, which is of extreme importance because of the size and weight limitations faced by current vehicle manufactures, they run cooler (particularly in reference to an electromagnetic transducer) and also because they are currently much more economical than all of the variations referenced above.

The forgoing is considered as illustrative only of the principles of the invention. Further, since numerous modifications and changes will readily occur to those skilled in the art, it is not desired to limit the invention to the exact construction and operation shown and described. For example, it is anticipated that the loudspeaker system of the present invention may be utilized in conjunction with the conventional speaker systems of vehicles which are described above. In addition, the novel system of the present invention can be integrated with a vehicle's cellular telephone or other two-way radio system to thereby form an external loudspeaker for the telephone or radio system. In such applications, where a "hands-free" cellular system is desired at least one microphone for the cellular system can be also placed in the vicinity of the trim panel, and preferably within the trim panel, near where the driver would be seated in the vehicle, such as on or in the sun visor, the pillar between the windshield and the door, the instrument panel, the headrest, the seat, and so forth, depending upon the vehicle and its characteristics. In this regard, an array of microphones could be utilized.

Accordingly, all suitable modifications and equivalents may be resorted to, falling within the scope of the invention.

What is claimed is:

1. A loudspeaker system, comprising:
   a transducer capable of being excited by applied electric potential;
   a diaphragm that is driven by the excited transducer, said diaphragm being comprised of a trim panel of a vehicle, wherein said trim panel has a substantially smaller area than a headliner of the vehicle;
   a coupler element, having a larger surface area than said transducer, that improves mechanical matching and coupling of said excited transducer to said trim panel, wherein said trim panel has a mechanical impedance that is substantially matched to that of the transducer by said coupler element; and
   electronic means electrically connected to said transducer to apply electric potential thereto.

2. The loudspeaker system of claim 1 wherein the transducer is flat.

3. The loudspeaker system of claim 2 wherein the transducer is enclosed within the body of the trim panel.

4. The loudspeaker system of claim 1 wherein the trim panel has a breach therein which defines an aperture in which said transducer is inserted.

5. The loudspeaker system of claim 1 wherein the trim panel is a composite comprised of a stiffened layer and a compliant layer.

6. The loudspeaker system of claim 5 wherein the transducer is located within the compliant layer.

7. The loudspeaker system of claim 5 wherein the transducer is located intermediate the compliant layer and the stiffened layer.

8. The loudspeaker system of claim 1 wherein the transducer is a flat piezoelectric element having a top side and an under side, with the under side of the piezoelectric element being bonded to a portion of the trim panel.

9. The loudspeaker system of claim 8 wherein the trim panel has a substantially flat portion to which the under side of the piezoelectric element is bonded.

10. The loudspeaker system of claim 9 wherein the portion of the trim panel to which the under side of the piezoelectric element is bonded has a greater degree of stiffness than the other portions of the trim panel.

11. The loudspeaker system of claim 1 wherein the transducer is a magneto-strictive transducer.

12. The loudspeaker system of claim 1 wherein the transducer is a electro-magnetic transducer.

13. The loudspeaker system of claim 1 wherein the transducer is a electro-static transducer.

14. The loudspeaker system of claim 1 wherein the transducer is a micro-motor.

15. The loudspeaker system of claim 1 wherein the transducer is a multi-layer medium.

16. The loudspeaker system of claim 15 wherein the trim panel consists of alternating layers of a spacing material and a rigid inextensible layer.

17. The loudspeaker system of claim 16 wherein the spacing material is a closed cell foam.

18. The loudspeaker system of claim 16 wherein the rigid inextensible layer is a cloth layer.

19. The loudspeaker system of claim 1 wherein the trim panel is curved.

20. The loudspeaker system of claim 19 wherein the transducer is located adjacent the curvature of the trim panel.

21. The loudspeaker system of claim 1 wherein the trim panel has a thickness of from about 0.06 inch to about 0.75 inch.

22. The loudspeaker system of claim 21 wherein the trim panel has a thickness of from about 0.25 inch to about 0.625 inch.

23. The loudspeaker system of claim 1 wherein the electronic means includes an amplifier which is located in the vicinity of the transducer.

24. The loudspeaker system of claim 23 wherein the amplifier is located at the transducer to form an integrated assembly.

25. The loudspeaker system of claim 1 wherein the trim panel is a door panel in a vehicle.

26. The loudspeaker system of claim 1 wherein the trim panel is part of the dash in a vehicle.

27. The loudspeaker system of claim 1 wherein the loudspeaker is integrated with a cellular telephone system that is present in said vehicle to thereby form an external loudspeaker for said cellular telephone system.

28. The loudspeaker system of claim 27 wherein at least one microphone for the cellular telephone system is located in the vicinity of the trim panel.

29. A loudspeaker system, comprising:
   a plurality of transducers capable of being excited by applied electric potential;
   a diaphragm that is driven by said excited transducers, said diaphragm being comprised of a trim panel of a vehicle, wherein said trim panel has a substantially smaller area than a headliner of the vehicle;
   a coupler element, having a larger surface area than said plurality of transducers, that improves mechanical matching and coupling of said excited transducers to said trim panel, wherein said trim panel has a mechanical impedance that is substantially matched to that of the plurality of transducers by said coupler element; and
   electronic means electrically connected to each transducer to apply electric potential thereto.

30. The loudspeaker system of claim 29 wherein the electronic means includes an equal number of amplifiers as there are transducers, with each amplifier being located in the vicinity of a corresponding transducer.

31. The loudspeaker system of claim 30 wherein each amplifier is located at its corresponding transducer to form an integrated assembly.

32. A loudspeaker system, comprising:
   a transducer capable of being excited by applied electric potential, said transducer having a top side and an under side;

a single diaphragm that is driven by the excited transducer having a side to which the under side of the transducer is bonded, wherein the diaphragm is comprised of a trim panel of a motor vehicle having a substantially smaller area than a headliner of the vehicle;

a coupler element, having a larger surface area than said transducer, that improves mechanical matching and coupling of said excited transducer to said trim panel, wherein said trim panel has a mechanical impedance that is substantially matched to that of said transducer by said coupler element; and electronic means being electrically connected to said transducer to apply electric potential thereto.

33. The loudspeaker system of claim 32 wherein the substantially flat portion of the trim panel to which the under side of the piezoelectric element is joined has a greater degree of stiffness than the other portions of the trim panel.

34. A loudspeaker system, comprising:

a piezoelectric element subject to displacement by applied electric potential and having a top side, an under side and an outer perimeter;

a substrate having an upper and lower side, with the upper side of the substrate being joined to the underside of the piezoelectric element, said substrate having a larger surface area than the piezoelectric element and having substantially the same rigidity as the piezoelectric element but a greater rigidity than the diaphragm to which the lower side of the substrate will be attached;

means to apply electric potential to the piezoelectric element; and a diaphragm that is driven by the exited piezoelectric element, said diaphragm being comprised of a trim panel of a vehicle having a substantially smaller area than a headliner of the vehicle and having a mechanical impedance that is substantially matched to that of the piezoelectric element by the substrate which functions as a coupler element, wherein the substrate improves mechanical matching and coupling of said piezoelectric element to said trim panel.

35. The loudspeaker system of claim 34 further comprising at least one motion coupler having an upper side and an under side and an outer edge, which motion couple is attached by at least a portion of its outer edge to at least a portion of the outer perimeter of the piezoelectric element and on its underside to the upper side of the substrate.

36. The loudspeaker system of claim 35 wherein the at least one motion coupler is in one piece which completely surrounds the piezoelectric element and is comprised of the same material as the substrate.

* * * * *